J. WELLS.
NUT LOCK.
APPLICATION FILED JUNE 6, 1916.
1,263,175.
Patented Apr. 16, 1918.
2 SHEETS—SHEET 1.
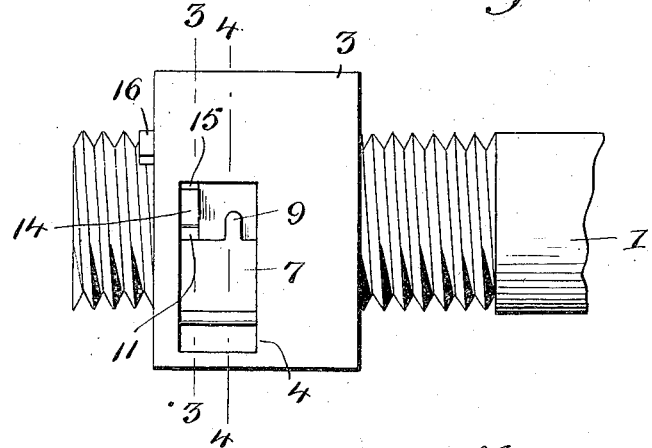
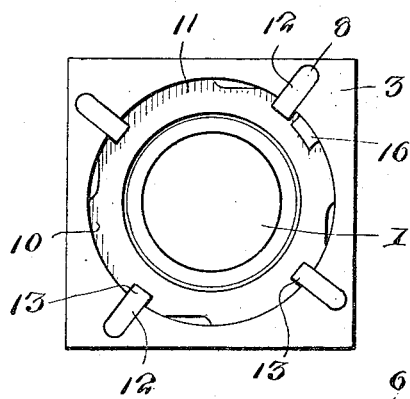
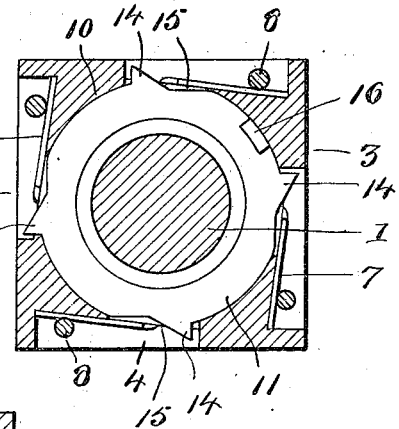
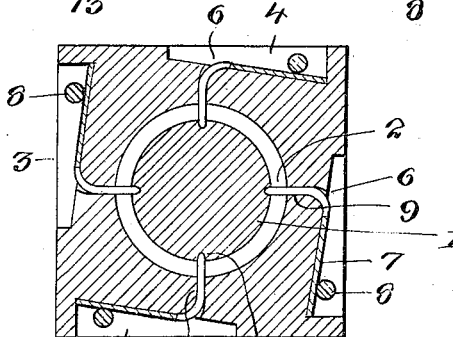
Witness
E. Q. Ruppert.
Inventor
J. Wells
By Victor J. Evans
Attorney J. WELLS.
NUT LOCK.
APPLICATION FILED JUNE 6, 1916.
1,263,175.
Patented Apr. 16, 1918.
2 SHEETS—SHEET 2.
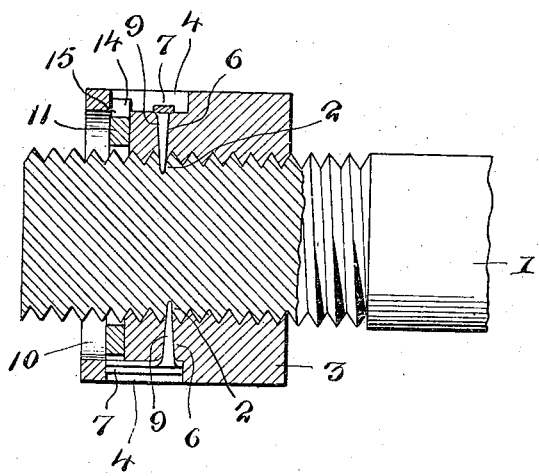
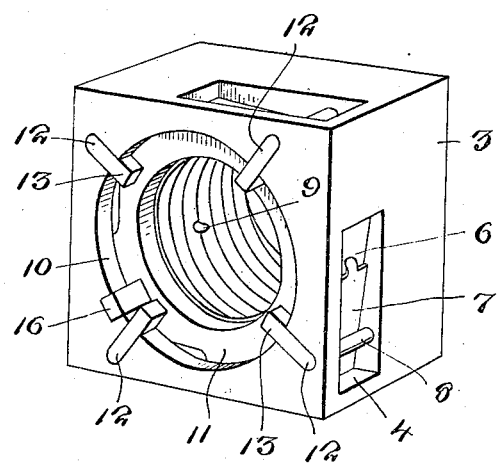
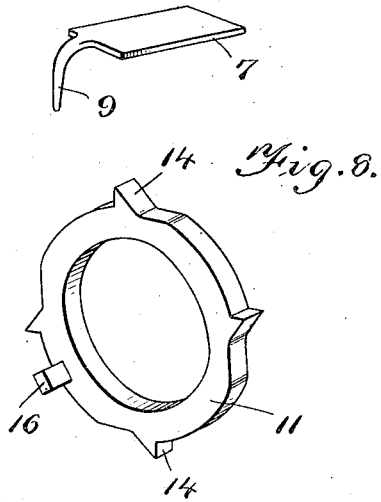
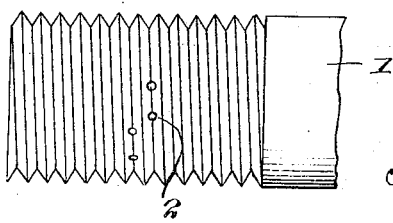
Witness
E. R. Ruppert
Inventor
J. Wells
By Victor J. Evans
Attorney

UNITED STATES PATENT OFFICE.

JULIUS WELLS, OF ROXBURY, VERMONT.

NUT-LOCK.

1,263,175.

Specification of Letters Patent.

Patented Apr. 16, 1918.

Application filed June 6, 1916. Serial No. 101,972.

*To all whom it may concern:*

Be it known that I, JULIUS WELLS, a citizen of the United States, residing at Roxbury, in the county of Washington and State of Vermont, have invented new and useful Improvements in Nut-Locks, of which the following is a specification.

This invention relates to means whereby a nut may be effectively locked upon a bolt and also whereby the nut may be unscrewed from the bolt when desired.

With the above and other objects in view the improvement resides in the construction, combination and arrangement of parts set forth in the following specification and falling within the scope of the appended claims.

In the drawings.

Figure 1 is a side elevation of a nut and bolt constructed and locked in accordance with the present invention, Fig. 2 is a front elevation of the same, Fig. 3 is a sectional view approximately on the line 3—3 of Fig. 1, Fig. 4 is a similar sectional view approximately on the line 4—4 of Fig. 1, Fig. 5 is a longitudinal sectional view approximately on the line 5—5 of Fig. 1, Fig. 6 is a perspective view of the nut, Fig. 7 is a similar view of one of the locking members associated with the nut, Fig. 8 is a similar view of the ring or turning member having the cam surfaces thereon for moving the spring locking members out of engagement with the bolt, and Fig. 9 is an elevation upon an enlarged scale of the bolt.

Referring now to the drawings in detail, the numeral 1 designates a bolt which has its shank between its threads formed with a plurality of spaced depressions 2.

The numeral 3 designates a nut which is screwed upon the bolt 1. This nut may be of any desired form and has its sides, from adjacent one of the corners thereof, formed with longitudinally arranged depressed portions or pockets 4. These pockets are preferably of a substantially rectangular formation and each of the same is provided with an aperture 6 which communicates with the threaded bore of the nut, the said aperture, in the showing of the drawings, being arranged at right angles to each other and each approximately in a line with the center of the said bore of the nut.

Arranged within each of the pockets 4 is a spring locking member 7. Each of these locking members 7 is secured one in each of the pockets 4, being connected with the pocket adjacent the end wall of the pocket nearest the corner of the nut, and consequently at the corner disposed farthest away from the aperture 6. The securing means may be in the nature of pins 8, and the free end of each of the spring locking plates 7 is formed with an angularly disposed tooth 9 which is received one within each of the apertures 6, and each of these teeth are of a length to enter the bore of the nut and to engage with one of the depressions 2 in the bolt 1.

The outer face of the nut is formed with an annular depression which surrounds and communicates with the bore of the nut, as indicated by the numeral 10, and within this depression is seated a ring member 11, the same being retained in the depression by inwardly projecting members or lugs 12 which may be provided by bending the outer ends of the pins 8 and extending the said bent portions, 13, inwardly toward the bore of the nut. The ring member 11 has its outer periphery formed with spaced cam-shaped projections 14 that are arranged each in an opening 15 and these openings communicate one with each of the pockets 4 and the said ring is further provided with an outwardly disposed operating finger or lug 16. By turning the ring in one direction the cam-shaped enlargements 14 will be brought to contact with the inner end wall of the opening 15, which terminate with the inner end walls of the pockets 4, so as to bring the said lugs out of contacting engagement with the spring locking members 7 and consequently not interfering with the engagement of the teeth thereof in the depressions 2 of the bolt. When the ring is turned in an opposite direction the cam members 11 will travel against the inner faces of the locking members 7 at the ends thereof provided with the teeth 9 and consequently spring the same outwardly of the pockets 4 and bring the teeth 9 out of engagement with the depressions 2, thus permitting the ready separation of the nut from the bolt.

From the above description, taken in connection with the accompanying drawings, the simplicity of the device as well as the advantages thereof will, it is thought, be perfectly apparent to those skilled in the art to which such invention appertains without further detailed description.

Having thus described the invention, what I claim is:

1. The combination with a bolt having spaced apertures between its threads, a nut screwed upon the bolt, said nut having its sides formed with pockets, a flat spring having one of its ends secured in each of the pockets and its other end formed with an angular tooth which passes through an opening in the pocket and enters the bore of the nut to engage with the apertures in the bolt, a ring member loosely connected to the nut, said ring having peripheral cams disposed to contact each with one of the springs at the toothed end thereof, and whereby by virtue of such contact the teeth of the springs will be brought out of engagement with the depressions in the bolt, and an operating finger for the ring.

2. The combination with a bolt having spaced apertures between its threads, a nut screwed upon the bolt, said nut having its sides formed with pockets, a flat spring in each of the pockets having one of its ends formed with an angular tooth which passes through an opening in the pocket and enters the bore of the nut to engage with an aperture in the bolt, a ring member having peripheral cams disposed to engage with the edges of the springs, an offset operating finger on the ring, pins passing through the pockets for securing the springs in the respective pockets, said pins having their outer ends provided with offset lugs, contacting with the outer face of the ring for retaining the ring upon the nut, and two of said lugs providing stop members for the operating finger of the ring.

In testimony whereof I affix my signature in presence of two witnesses.

JULIUS WELLS.

Witnesses:
C. W. ORCULT,
EDWIN A. STIMSON.

Copies of this patent may be obtained for five cents each, by addressing the "Commissioner of Patents, Washington, D. C."